3,408,156
PROCESS FOR PRODUCING STABLE SUPERSATURATED BORAX SOLUTIONS
Joseph G. Bower, Santa Ana, Calif., assignor to United States Borax & Chemical Corporation, Los Angeles, Calif., a corporation of Nevada
No Drawing. Filed Sept. 29, 1965, Ser. No. 491,443
1 Claim. (Cl. 23—59)

ABSTRACT OF THE DISCLOSURE

A process for producing a supersaturated solution of sodium borate. Sodium borate hexahydrate with a quantity of sodium metasilicate is heated to liquify the combination. Thereafter, the liquid is rapidly cooled.

---

This invention relates to supersaturated solutions of sodium borates. More particularly, this invention relates to a supersaturated solution of borax, that is, a solution which is dissolved in its own water of crystallization.

The general concept of producing a supersaturated borax solution which is essentially dissolved in its own water of crystallization is already known. Unfortunately, all supersaturated solutions have a strong tendency to crystallize the solute over a period of time. The crystallization may take effect for a number of reasons, for instance, by the inadvertent inclusion of nuclei upon which seed crystals may form. In order to overcome the lack of stability of supersaturated borax solutions, stabilizing inorganic compounds have been added. For instance, it is known to add alkali phosphates and phosphoric acid to stabilize a supersaturated borax solution.

As a result of such prior knowledge, additional efforts have been made in order to develop other stabilizing salts. For instance, various highly soluble hydrated sodium and potassium salts of weak oxygenated acids have been utilized. However, in most instances, the vast number of such salts are ineffective or are only moderately effective.

Accordingly, it is a primary object of the present invention to disclose a method and the resultant produced thereby of borax dissolved only in its water of crystallization with an inorganic salt as a stabilizer, said salt being an alkali metal metasilicate such as sodium metasilicate.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

The present invention contemplates the general concept of producing a supersaturated solution of borax, that is, a solution of borax dissolved in its own water of crystallization which is stabilized by the further inclusion of a quantity of sodium metasilicate ($Na_2SiO_3$). The borax utilized is the decahydrated sodium tetraborate.

It has been found that unexpected additional properties are obtained by utilizing the sodium metasilicate as the stabilizer. For instance, inasmuch as sodium metasilicate is a well-known film-forming agent, the inclusion of this material in the supersaturated solution of borax results in film formation which is not possible to achieve from a saturated sodium tetraborate solution. Additionally, in view of the well-known property of sodium metasilicate as an inorganic sequestering agent, the highly concentrated supersaturated borax solution of the present invention may be utilized in conjunction with cleaning operations in which borax itself plays a part. A further utility garnered from the employment of sodium metasilicate is its known anticorrosion activities.

Naturally, the stabilized solution of the present invention affords a borax solution which is mobile, dense and readily dispersible for dilution. In preservation or fire-retardation of wood, the supersaturated borax solution of the present invention allows room temperature impregnation at far higher levels of sodium borate concentration than have been used previously, and at the same time, both the preservative and flame retarding property of borax are strongly enhanced by the choice of the stabilizing salt, namely, sodium metasilicate.

In carrying out the concepts of the present invention, sodium tetraborate decahydrate is mixed with sodium metasilicate so that the admixture is very intimate. Then the mixture is heated to approximately 100° C. with continued stirring. It will be discerned that the mass is liquefied as the salts dissolve in their own water of crystallization while the temperature of 100° C. is maintained over a period of time accompanied with stirring throughout. The liquid mixture gradually becomes clearer except for some air bubbles which also disappear upon further stirring. Thereafter, the solution is rapidly chilled to room temperature. In order to obtain effective results, it is necessary during the heating step to prevent evaporation of water and formation of crust as potential seed crystals on the surface of the liquid.

The period of time during which the solution remains clear is dependent somewhat upon the quantity of the ingredients employed and, more importantly, the technique utilized in effecting the dissolution of the salts without inclusion of nuclei which are deleterious to the maintenance of a clear solution. Additionally, it was found that greater stability of the resultant is obtainable when the solution is maintained in a sealed container.

In carrying out the present invention some limits are to be observed. It was found, for instance, that effective values of the invention may be obtained when the quantity of the sodium metasilicate employed is as low as 30% by weight of the total mixture of sodium tetraborate decahydrate and sodium metasilicate and up to 60% by weight as a higher useful point. Naturally, intermediate levels within this range produced intermediate periods of time during which the supersaturated solution was maintained in a clear and stable condition.

Example I

Sodium tetraborate decahydrate in a quantity of 70 grams was mixed with 30 grams of sodium metasilicate ($Na_2SiO_3$); stirring was effected for a period of time to insure intimate contact of the salts. The mixture was heated as stated in the above to approximately 100° C. Interaction was noted as the salts were liquefied by dissolution in their water of crystallization. The stirring was continued for approximately 10 to 15 minutes while maintaining a temperature of approximately 100° C. resulting in clarification of the solution. Thereafter, the solution was rapidly chilled to room temperature and maintained in a sealed container. The stability of the solution produced in this example was approximately one day.

Example II

In this example the same ingredients were employed and the same technique in producing the solution was employed as in Example I. However, the quantity of sodium tetraborate decahydrate was 60 grams and the quantity of sodium metasilicate employed was 40 grams. The resultant supersaturated clear solution was found to be stable for a period of between 15 and 90 days.

Example III

In this example the same techniques were employed as in connection with Example I but the quantities of the ingredients employed was 50 grams of sodium tetraborate decahydrate and 50 grams of sodium metasilicate. This solution gave excellent stability characteristics in that the solution was still clear after more than 90 days.

In a variance of the technique in achieving a liquid supersaturated solution it was found that an alternative method could be used wherein the solid salts were first dissolved in water. These salts were then concentrated to a supersaturated condition for evaporation while heated to approximately 100° C. This technique produced clear, viscous solutions.

The resulting solutions of the present invention have specific gravities ranging from 1.6–1.75. The solutions dry to clear intumescent films.

It will be apparent that many changes and modifications of the several features described herein may be made without departing from the spirit and scope of the invention. It is therefore apparent that the foregoing description is by way of illustration of the invention rather than limitation of the invention.

What is claimed is:
1. The process for preparing a clear, stable supersaturated solution of borax wherein salts are dissolved only in their water of crystallization comprising mixing approximately 7 to 4 parts by weight sodium tetraborate decahydrate and approximately 3 to 6 parts by weight sodium metasilicate, heating the mixture to approximately 100° C. until said mixture becomes a clear liquid; preventing the evaporation of water and the formation of seed crystals during said heating and then rapidly cooling the mixture whereby the clear solution is maintained.

References Cited

UNITED STATES PATENTS 2,673,841   3/1954   Reinhard _____ 23—59 X

OSCAR R. VERTIZ, *Primary Examiner.*

H. T. CARTER, *Assistant Examiner.*